United States Patent
Rashidi et al.

(10) Patent No.: US 11,261,842 B2
(45) Date of Patent: Mar. 1, 2022

(54) METHOD AND APPARATUS FOR SELECTIVELY AMPLIFYING WIND SPEED ADJACENT A TURBINE ROTOR

(71) Applicant: JAM Green Technologies LLC, Willoughby Hills, OH (US)

(72) Inventors: Majid Rashidi, Pepper Pike, OH (US); Jaikrishnan R. Kadambi, Richmond Heights, OH (US); Anil Kumar Singh, Willoughby Hills, OH (US)

(73) Assignee: JAM GREEN TECHNOLOGIES LLC, Willoughby Hills, OH (US)

( * ) Notice: Subject to any disclaimer, the term of this patent is extended or adjusted under 35 U.S.C. 154(b) by 40 days.

(21) Appl. No.: 16/793,077

(22) Filed: Feb. 18, 2020

(65) Prior Publication Data

US 2020/0271090 A1 Aug. 27, 2020

Related U.S. Application Data

(60) Provisional application No. 62/809,743, filed on Feb. 25, 2019.

(51) Int. Cl.
*F03D 1/04* (2006.01)
*F03D 3/04* (2006.01)
*F03D 7/02* (2006.01)

(52) U.S. Cl.
CPC ............ *F03D 3/04* (2013.01); *F03D 1/04* (2013.01); *F03D 7/02* (2013.01); *Y02E 10/72* (2013.01)

(58) Field of Classification Search
CPC ............... F03D 1/04; F03D 7/02; Y02E 10/72
See application file for complete search history.

(56) References Cited

U.S. PATENT DOCUMENTS

| 9,644,603 | B1 | 5/2017 | Thiele et al. | |
| 2004/0113431 | A1* | 6/2004 | Huang | F03D 3/02 290/55 |
| 2009/0295164 | A1* | 12/2009 | Grabau | F03D 1/0658 290/55 |
| 2010/0034649 | A1* | 2/2010 | Taylor | F03B 17/061 415/208.1 |

(Continued)

OTHER PUBLICATIONS

Ohya, Yuji, and Takashi Karasudani. "A shrouded wind turbine generating high output power with wind-lens technology." Energies 3.4 (2010): 634-649.

(Continued)

*Primary Examiner* — Audrey B. Walter
(74) *Attorney, Agent, or Firm* — Tarolli, Sundheim, Covell & Tummino LLP

(57) ABSTRACT

An apparatus for selectively amplifying wind speed adjacent a turbine rotor includes a first deflection panel, having a curved front profile for selective placement laterally on a first side of turbine rotor in a working configuration. A second deflection panel has a curved front profile for selective placement laterally on a second side of the turbine rotor, laterally opposite the first side, in a working configuration. The first and second deflection panels are both configured to amplify wind speed adjacent the turbine rotor when in the working configuration, and to have minimal effect upon the wind speed adjacent the turbine rotor when in a stowed configuration. A method of selectively amplifying wind speed adjacent a turbine rotor is also described.

19 Claims, 7 Drawing Sheets

(56) References Cited

U.S. PATENT DOCUMENTS

| | | | | |
|---|---|---|---|---|
| 2014/0030059 A1* | 1/2014 | Presz, Jr. | ................ | F03D 7/028 |
| | | | | 415/1 |
| 2014/0182263 A1* | 7/2014 | Allinson | ............... | F03D 3/0427 |
| | | | | 60/39.01 |
| 2019/0383261 A1* | 12/2019 | Bader | ....................... | F03D 1/04 |
| 2020/0300213 A1* | 9/2020 | Navarro | ................... | F03D 1/04 |

OTHER PUBLICATIONS

Rashidi, Majid, Jaikrishnan R. Kadambi, and Renjie Ke. "Wind Energy Harnessing System for Low and High Wind Speeds." ASME 2019 International Mechanical Engineering Congress and Exposition. American Society of Mechanical Engineers Digital Collection.

* cited by examiner

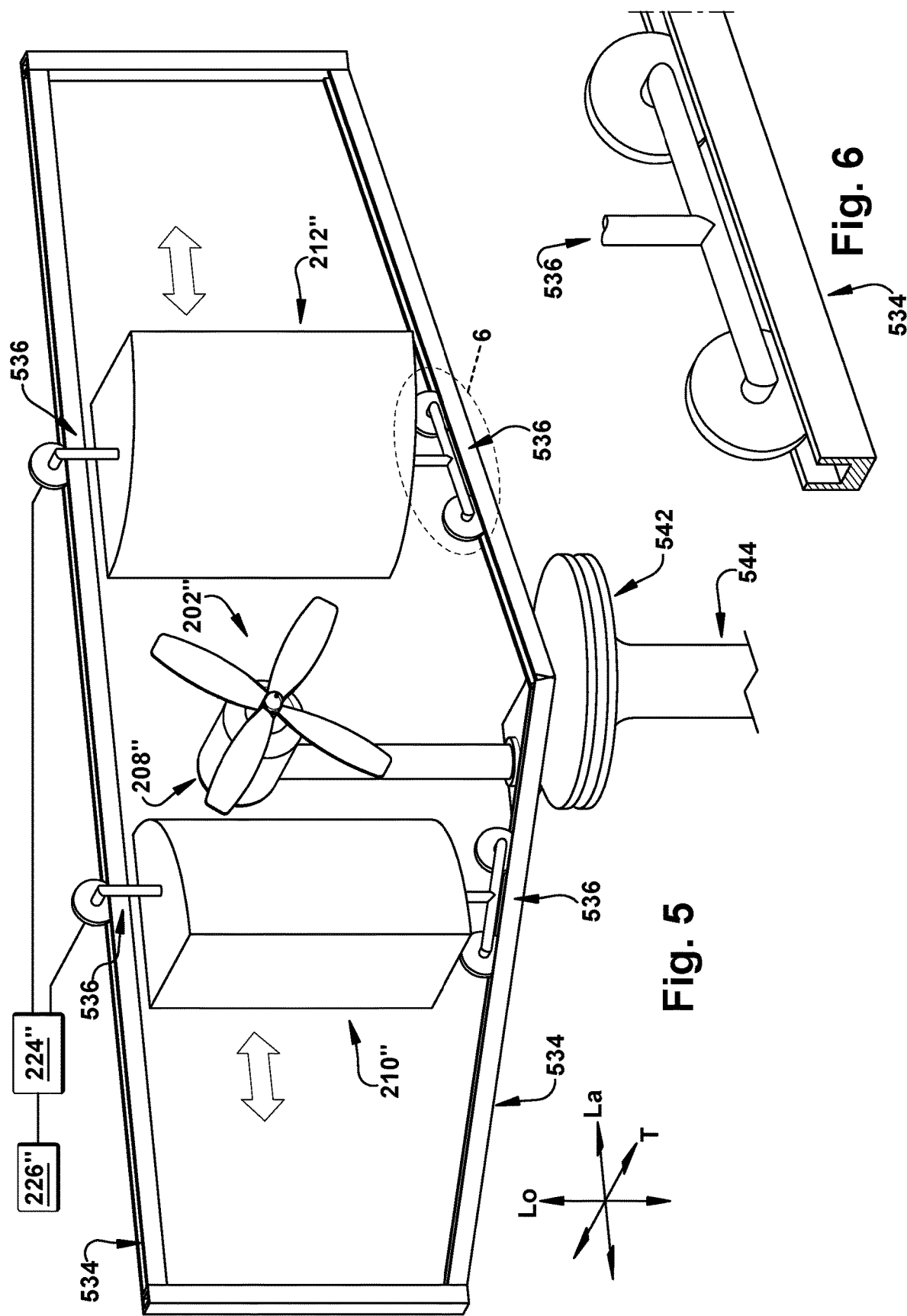

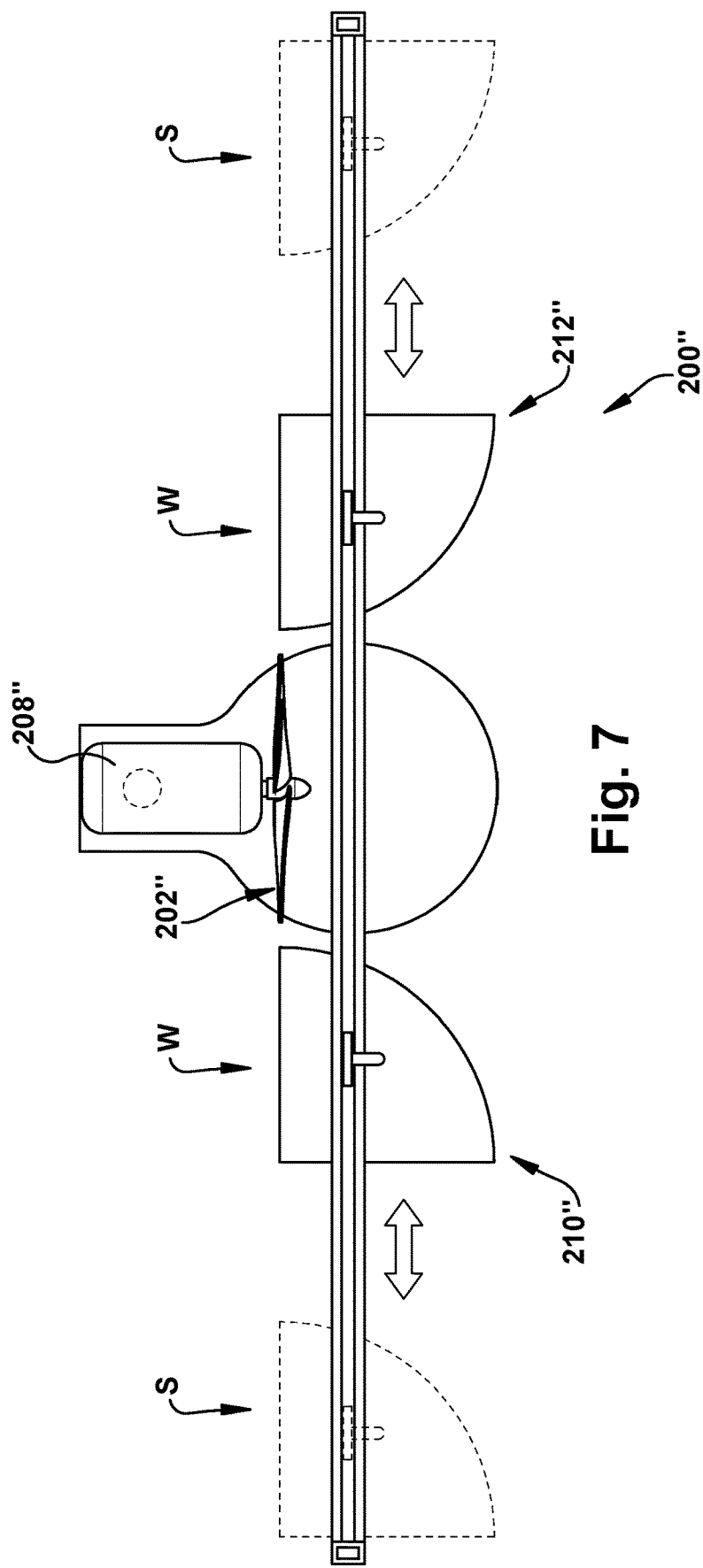

METHOD AND APPARATUS FOR SELECTIVELY AMPLIFYING WIND SPEED ADJACENT A TURBINE ROTOR

RELATED APPLICATION

This application claims priority from U.S. Provisional Application No. 62/809,743, filed 25 Feb. 2019, the subject matter of which is incorporated herein by reference in its entirety.

TECHNICAL FIELD

This disclosure relates to an apparatus and method for use of a wind deflector structure and, more particularly, to a method and apparatus for selectively amplifying wind speed adjacent a turbine rotor.

BACKGROUND

Wind energy is a growing market around the world and efficient methods for harnessing energy from wind are continually being investigated. One method of collecting wind energy is through small scale rooftop wind turbines. Rooftop wind turbines tend to struggle to produce consistent power because of low wind speed in urban settings; however, the power output of these types of turbines can be improved in order to make them a more prominent contributor in the wind energy market.

Wind turbine performance and power output are directly related to the cubic exponent of the wind speed passing and impinging upon the turbine rotor. Therefore, one way to increase turbine power output is to increase the natural wind speed at the spot the wind turbine is located. It has been shown analytically and experimentally that a cylindrical wind deflecting structure increases the wind speed around the cylinder by a factor of about 1.6 (shown by the shaded areas in FIG. 1 next to the transverse cross-section of the cylinder, with the wind flow shown by the streamlines in that Figure). A typical rooftop wind turbine located adjacent to the wind deflecting structure would accordingly have a power output which is about 4 times higher than the same wind turbine standalone under the same natural wind speed. Such a wind deflecting structure can help improve performance of the turbines in the urban setting where wind speeds are usually low. At times, however, under high natural wind speed conditions, the wind deflecting structure will increase the wind speed to a magnitude that may damage portions of the turbine, including the turbine rotor, turbine electronics and the support structure.

Wind turbines are generally rated at their maximum power generation under their specific wind speeds. The maximum limit of wind speed for a typical wind turbine is called the cut-off or survival speed. A typical cut-off speed is about 25 m/s (56 mph), which limit can be easily reached for the artificially increased wind speeds adjacent a wind deflecting structure at times when the natural or ambient wind speeds are even merely moderately strong.

SUMMARY

In an aspect, an apparatus for selectively amplifying wind speed adjacent a turbine rotor is described. The apparatus comprises a first deflection panel, having a curved front profile for selective placement laterally on a first side of turbine rotor in a working configuration. A second deflection panel has a curved front profile for selective placement laterally on a second side of the turbine rotor, laterally opposite the first side, in a working configuration. The first and second deflection panels are both configured to amplify wind speed adjacent the turbine rotor when in the working configuration, and to have minimal effect upon the wind speed adjacent the turbine rotor when in a stowed configuration.

In an aspect, an apparatus for selectively amplifying wind speed adjacent a turbine rotor is described. The apparatus comprises a first deflection panel, having a curved front profile; a second deflection panel, having a curved front profile; and a frame extending in a lateral direction relative to the turbine rotor on at least one of the first and second sides thereof. At least one of the first and second deflection panels is movably connected to the frame for sliding lateral motion with respect thereto between a working configuration at a first lateral position relative to turbine rotor and a stowed configuration at a second lateral position relative to the turbine rotor. The second lateral position is further away from the turbine rotor than is the first lateral position. The first and second deflection panels are both configured to amplify wind speed adjacent the turbine rotor when in the working configuration, and to have minimal effect upon the wind speed adjacent the turbine rotor when in the stowed configuration.

In an aspect, a method of selectively deflecting wind power adjacent a turbine rotor is described. An apparatus is provided, including a first deflection panel having a curved front profile and a second deflection panel having a curved front profile. The first deflection panel is selectively placed laterally on a first side of turbine rotor in a working configuration in which the first deflection panel amplifies wind speed adjacent the turbine rotor. The second deflection panel is selectively placed laterally on a second side of the turbine rotor in a working configuration in which the first deflection panel amplifies wind speed adjacent the turbine rotor. The first and second deflection panels are selectively moved between the working configuration and a stowed configuration in which the first and second deflection panels have a minimal effect upon the wind speed adjacent the turbine rotor.

BRIEF DESCRIPTION OF THE DRAWINGS

For a better understanding, reference may be made to the accompanying drawings, in which:

FIG. 5 is a front perspective view of a third example aspect of the present invention in a working configuration;

FIG. 6 is a detail of area "6" in FIG. 5;

FIG. 7 is a schematic top view of the third aspect of FIG. 6 in a working configuration.

DESCRIPTION OF ASPECTS OF THE DISCLOSURE

Figure 1:
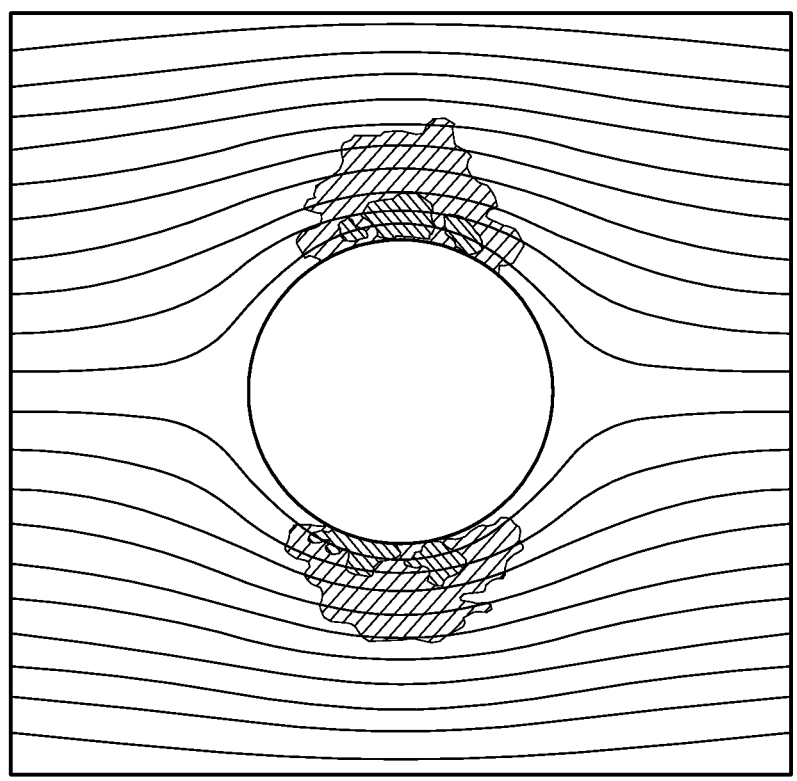
FIG. 1 is a schematic depiction of a prior art scientific principle.

Unless defined otherwise, all technical and scientific terms used herein have the same meaning as is commonly understood by one of ordinary skill in the art to which the present disclosure pertains.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

As used herein, phrases such as "between X and Y" and "between about X and Y" can be interpreted to include X and Y.

As used herein, phrases such as "between about X and Y" can mean "between about X and about Y."

As used herein, phrases such as "from about X to Y" can mean "from about X to about Y."

It will be understood that when an element is referred to as being "on," "attached" to, "connected" to, "coupled" with, "contacting", "adjacent", etc., another element, it can be directly on, attached to, connected to, coupled with, contacting, or adjacent the other element or intervening elements may also be present. In contrast, when an element is referred to as being, for example, "directly on," "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under," "below," "lower," "over," "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

Figure 2:
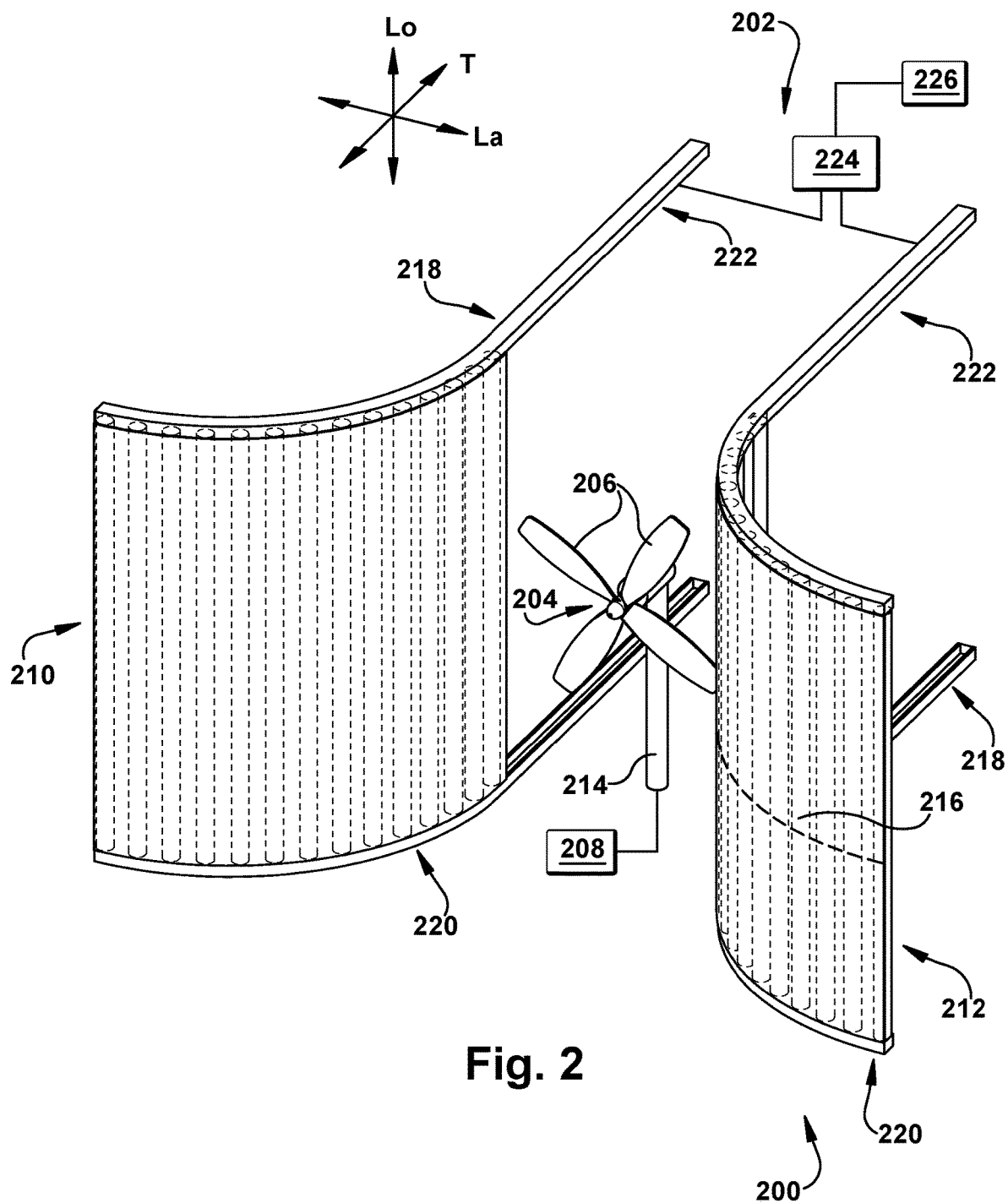
FIG. 2 is a front perspective view of a first example aspect of the present invention.
Figure 3A:
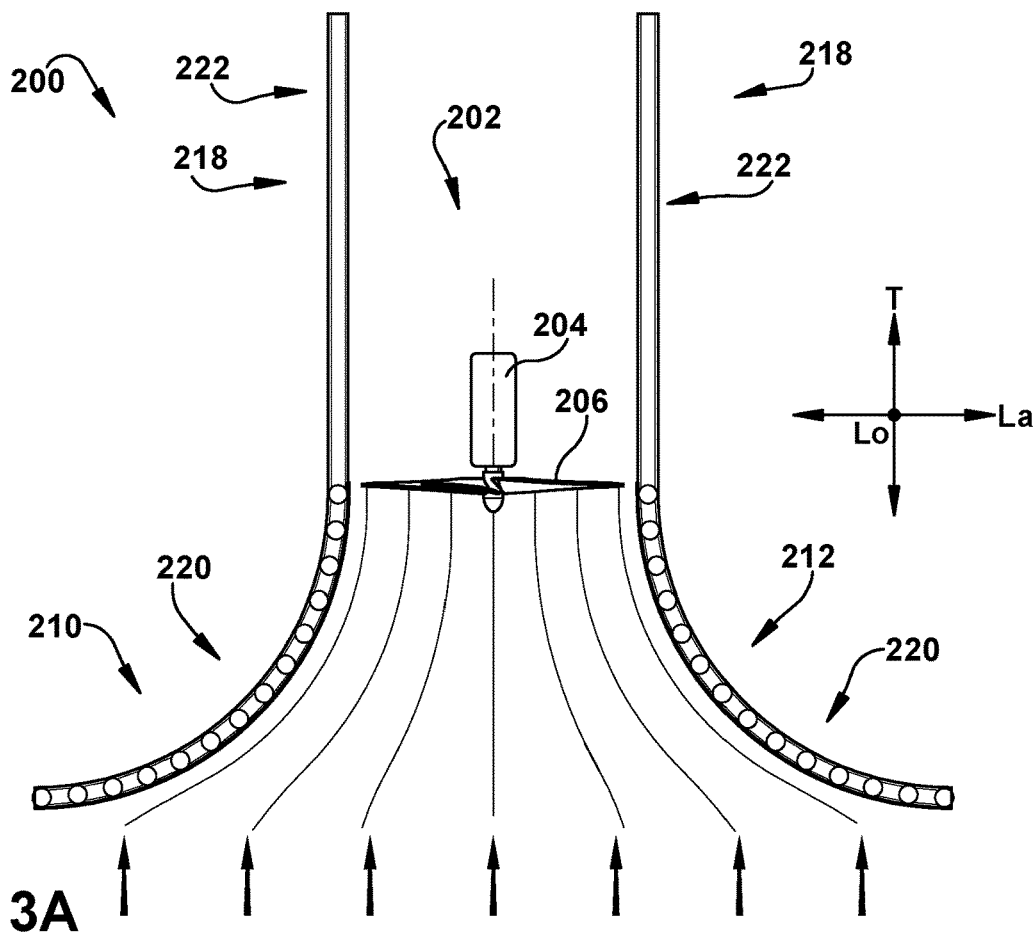
FIG. 3A is a schematic top view of the first aspect of FIG. 2 in a working configuration.
Figure 3B:
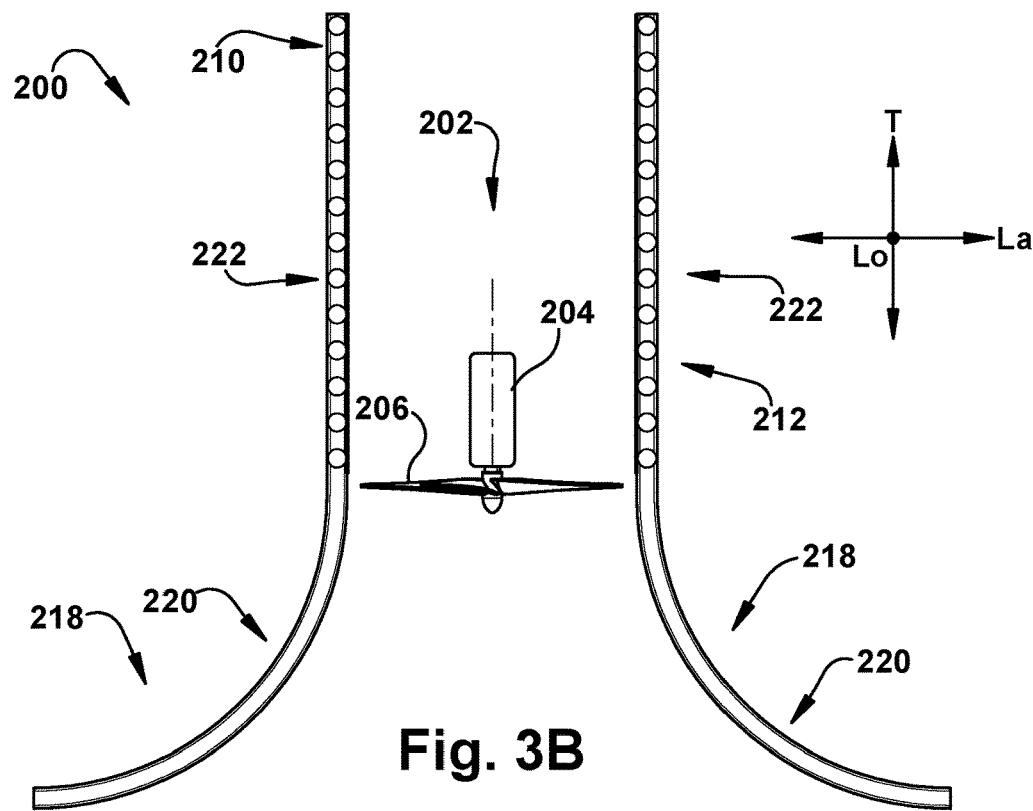
FIG. 3B is a schematic top view of the first aspect of FIG. 2 in a stowed configuration.

FIGS. 2-3B depict an apparatus 200 for selectively amplifying wind speed adjacent a turbine rotor 202. A wind turbine system includes the turbine rotor 202, including a hub 204 and at least one blade 206. The wind turbine system also includes a generator (shown schematically at 208 in FIG. 2), and the apparatus 200. The generator 208 is used to generate electricity in a known manner from the turning of the turbine rotor 202.

The apparatus 200 includes a first deflection panel 210, having a curved front profile for selective placement laterally on a first side of a turbine rotor 202, when the first deflection panel 208 is in a working configuration. The apparatus 200 also includes a second deflection panel 212, having a curved front profile for selective placement laterally on a second side of the turbine rotor 202, laterally opposite the first side, when the second deflection panel 212 is in a working configuration. The term "lateral", as used herein, references a direction which is substantially horizontal, in the orientation of FIGS. 3A-3B, and which is labeled as orthogonal direction La, in the Figures.

The first and second deflection panels 210 and 212, respectively, are both configured to amplify wind speed adjacent the turbine rotor 202 when in the working configuration, and to have minimal effect upon the wind speed adjacent the turbine rotor 202 when in a stowed configuration. The first and second deflection panels 210 and 212, when in the working configuration, may have front profiles that are substantially mirrored from one another about a transverse-longitudinal plane passing through a support post 214 of the turbine rotor 202. The transverse-longitudinal plane is shown, for example, as line T-Lo in FIG. 3A. It is contemplated, though, that the front profiles of the first and second deflection panels 210 and 212 may be asymmetrically arranged about the transverse-longitudinal plane for a particular use environment.

At least one of the first and second deflection panels 210 and 212 may have a substantially constant lateral cross-sectional profile along a longitudinal direction, when in the working configuration. The term "longitudinal", as used herein, references a direction which is substantially vertical, in the orientation of FIG. 2, and which is labeled as orthogonal direction Lo, in the Figures. Therefore, a lateral cross-sectional profile is one which resembles the schematic section of the first and second deflection panels 210 and 212 shown in FIGS. 3A-3B, which may be substantially constant when taken at various longitudinal points along the first and second deflection panels 210 and 212 themselves. It is contemplated, though, that at least one of the first and second deflection panels 210 and 212 could have any desired cross-sectional profile, including, but not limited to, a linear, curvilinear, or other shape, and that the front profile of the first or second deflection panel 210 or 212 could have a conical, hourglass, prismatic, spherical, pyramidal, ovoid, irregular, linear, curvilinear, or any other desired shape, as seen in any direction. For the nonlimiting sake of ease of discussion, however, the front profiles of the first and second deflection panels 210 and 212 will be discussed below as presenting a regular right cylindrical shape toward a viewer standing upwind of the turbine rotor 202.

The curved front profiles of at least one of the first and second deflection panels 210 and 212 may have at least a 90-degree curved span. More particularly, at least one of the curved front profiles may have a curved span between about 85-degrees and 130-degrees, such as from about 105-degrees to 115-degrees. The term "curved span" is used herein to reference an angle encompassed by a sector of a circle having the curved front profile as a partial circumference thereof.

The first and second deflection panels 210 and 212 may have any desired construction, and need not be of the same construction as each other. For example, the first and second deflection panels 210 and 212 could mainly comprise just the curved front profile, created by a thin, sheet-like material configured to be held in the curved shape shown in the Figures, in the working configuration. A solid or skeletal framework could be provided to assist with maintaining the sheet-like material in the desired shape. The first and second deflection panels 210 and 212 could comprise a structure having the aspect of about a quarter of a right circular cylinder, formed of one solid block of material, or of a skeletal framework at least partially covered by a "skin" of any desired thickness. The material of the first and second deflection panels 210 and 212 could be at least partially air permeable, or could be wholly impermeable by air.

It is contemplated that a single first or second deflection panel 210 or 212 could have a different construction in different areas thereof. For example, a longitudinally lower portion of the first or second deflection panel 210 or 212 could be of the right circular cylinder block type, while a longitudinally upper portion of the same first or second deflection panel 210 or 212 could be a "sail" type structure comprising a thin sheet-like material extending upward from a curved front profile portion of the block. The upwind surface of the first and second deflection panels 210 and 212 could have any desired texture, protrusions, apertures, or other surface features for a particular use environment. One of ordinary skill in the art would be readily able to design first and second deflection panels 210 and 212 as desired, for use with the present invention.

The apparatus 200 may include a mechanical fuse (shown schematically at 216) which is configured to move at least one of the first and second deflection panels 210 and 212 between the working configuration and a halt configuration responsive to a wind speed adjacent the turbine rotor 202. The mechanical fuse 216, when present, is intended to provide an "emergency stop" function to the apparatus 200 when wind speeds exceed those which are likely to cause damage to the turbine rotor 202, first or second deflection panels 210 or 212, or any other components of the apparatus 200 or the wind turbine system in general. In most use environments, the mechanical fuse 216 will be a simple structure which "yields" or otherwise changes the physical configuration of the first and second deflection panels 210 and 212 from the working configuration to the halt configuration. A mechanical fuse 216 could include some electronic and/or electrical components (e.g., a sensor and/or actuator), as desired. The mechanical fuse 216 may be of any desired type, and the halt configuration may be a temporary or permanent condition. For example, as shown in FIG. 2, the mechanical fuse 216 is a frangible area along the face of the curved front profile which is configured to "burst" or "punch" open into the halt configuration once a predetermined wind speed is reached, so that air can pass through the structure of the first or second deflection panel 210 or 212 without causing bending damage to components thereof. The curved front profile could have either a disposable frangible area (i.e., the sheet-like material tears and cannot be readily repaired) or a reusable frangible area (i.e., hook-and-loop fasteners or other structures are provided that can be "reset" to the working condition once the wind speed drops).

As another example, the mechanical fuse 216 could include a mounting structure including at least one spring, similar to known spring-loaded metal sidewalk advertising signs. In this type of mechanical fuse 216, the spring will allow the first or second deflection panel 210 or 212 to "fall" or be pushed over toward a downstream direction, into the halt configuration, once the wind reaches a speed at which air pressure on the curved front surface causes force sufficient to overcome the spring bending force. In a spring-type mechanical fuse 216, the first or second deflection panel 210 or 212 could be configured to return from the halt configuration to the working configuration once the wind speed drops sufficiently for the spring to re-erect the first or second deflection panel 210 and 212. One of ordinary skill in the art can readily provide a suitable mechanical fuse 216 configured to move a first or second deflection panel 210 or 212 from a working configuration into a halt configuration, and potentially back into the working configuration, responsive to a predetermined wind speed for a particular use environment of the apparatus 100.

One or both of the curved front profiles may present a convex aspect toward a direction of wind entry to the turbine rotor (i.e., toward the upstream direction), as shown in the Figures. It is also contemplated that at least one of the first or second deflection panels 210 or 212 could concurrently function as a first or second deflection panel for a second turbine rotor (not shown) which is located laterally to the initial turbine rotor 202. In this manner, a group of apparatuses 200 and turbine rotors 202 could be daisy-chained together into a horizontal "wind farm" configuration. Additionally, it is contemplated that a single first or second deflection panel 210 or 212 could serve as a corresponding portion of an apparatus 200 for any desired number of turbine rotors 202 which are stacked longitudinally with respect to each other, for a vertical "wind farm" configuration.

The first and second deflection panels 210 and 212 may each be movable between the stowed and working configurations independent from one another, or the first and second deflection panels 210 and 212 could be mechanically, electrically, or otherwise linked for concurrent and/or coordinated motion between the stowed and working configurations. The working configuration of the first and second deflection panels 210 and 212, in most use environments of the apparatus 200 will be very similar, regardless of the specific structure of the apparatus 200. That is, the first and second deflection panels 210 and 212 will be arranged to hold the curved front profiles thereof in a position relative to the turbine rotor 202 which is sufficient to achieve desired wind speed enhancement/amplification results. It is contemplated that a single first or second deflection panel 210 or 212 could be provided in certain use environments, instead of the pair of panels shown and referenced herein.

In contrast, the stowed configuration of the first and second deflection panels 210 and 212 may somewhat vary, depending on the particular structure of the apparatus 200. Three example aspects of the present invention will now be described, with reference to the Figures, although the scope of the invention is not limited to the described aspects.

As shown in FIGS. 2-3B, at least one of the first and second deflection panels 210 and 212 may be mounted on a track 218. The track 218 shown in the Figs. is actually a double-railed track, which engages both the top and bottom of the first and second deflection panels 210 and 212. However, it is contemplated that there could be a single-railed track, with the single rail being located in any desired position with respect to the first and second deflection panels 210 and 212, or any other number and configuration of rails could be provided to the track 218 for a particular use environment. The first and second deflection panels 210 and 212 could also be attached to the respective track 218, and move therealong, in any desired manner. For example, a structure using relatively thin vertical rods, much like a roll-top desk mechanism, is shown in FIGS. 2-3B. It is also contemplated that a conveyor belt, rack and pinion, elastic band, "garage door" type mount, and/or other suitable mechanism could be provided to guide and move the first and second deflection panels 210 and 212 along the respective track 218, and one of ordinary skill in the art can readily provide a suitable mounting and motion arrangement for a desired use environment.

Here, the tracks 218 are each shown as having a substantially "J" shape when viewed from a longitudinally oriented direction, with the track 218 including a substantially convex portion 220, the convexity being defined within the lateral-transverse plane (i.e., substantially parallel to the plane of the page in FIGS. 3A-3B). The convex portion 220 is located at least one of laterally adjacent to, and transversely forward of, the turbine rotor 202. The track 218 also includes a substantially linear portion 222 extending transversely rearward (i.e., downstream, in the wind direction) from the turbine rotor 202.

At least one of the first and second deflection panels 210 and 212 is configured for transversely oriented motion along the track 218 such that the convex portion 220 of the track 218 imposes the curved front profile on the first or second deflection panel 210 or 212 when in the working configuration. This is the arrangement depicted in FIG. 3A. Then, once the first or second deflection panel 210 or 212 moves into the "straightaway" portion of the track 218, the linear portion 222 of the track 218 will impose a linear profile on the first or second deflection panel 210 or 212 when in the stowed configuration, as shown in FIG. 3B. The first or second deflection panel 210 or 212 will be in a substantially planar configuration, which is parallel to a direction of wind entry to the turbine rotor 202 in the stowed configuration and will accordingly have minimal effect on apparent wind speed at the turbine rotor 202—particularly when the stowed configuration places the first or second deflection panel 210 or 212 downstream from the turbine rotor 202. It should be noted that, due to design, component wear, local ambient conditions, or for any other reason, a configuration or physical arrangement characterized herein as "curved", "linear", "planar", or the like could have a minor deviation from an arrangement which is mathematically purely "curved", "linear", "planar", or the like. These terms are used to indicate a general trend of the physical arrangement, and some local deviation which is not sufficient to change the general character of the physical arrangement and the functioning thereof is permissible.

As with any aspect of the present invention, the apparatus 200 shown in FIGS. 2-3A can include a motor (shown schematically at 224 in FIG. 2) for selectively moving at least one of the first and second deflection panels 210 and 212 between the stowed and working configurations responsive to deflector commands from a controller (shown schematically at 226 in FIG. 2). When present, the deflector commands may be at least partially generated by the controller 226 responsive to a measured wind speed adjacent the turbine rotor 202, such as through the use of an anemometer (not shown) or other measurement device.

Figure 4A:
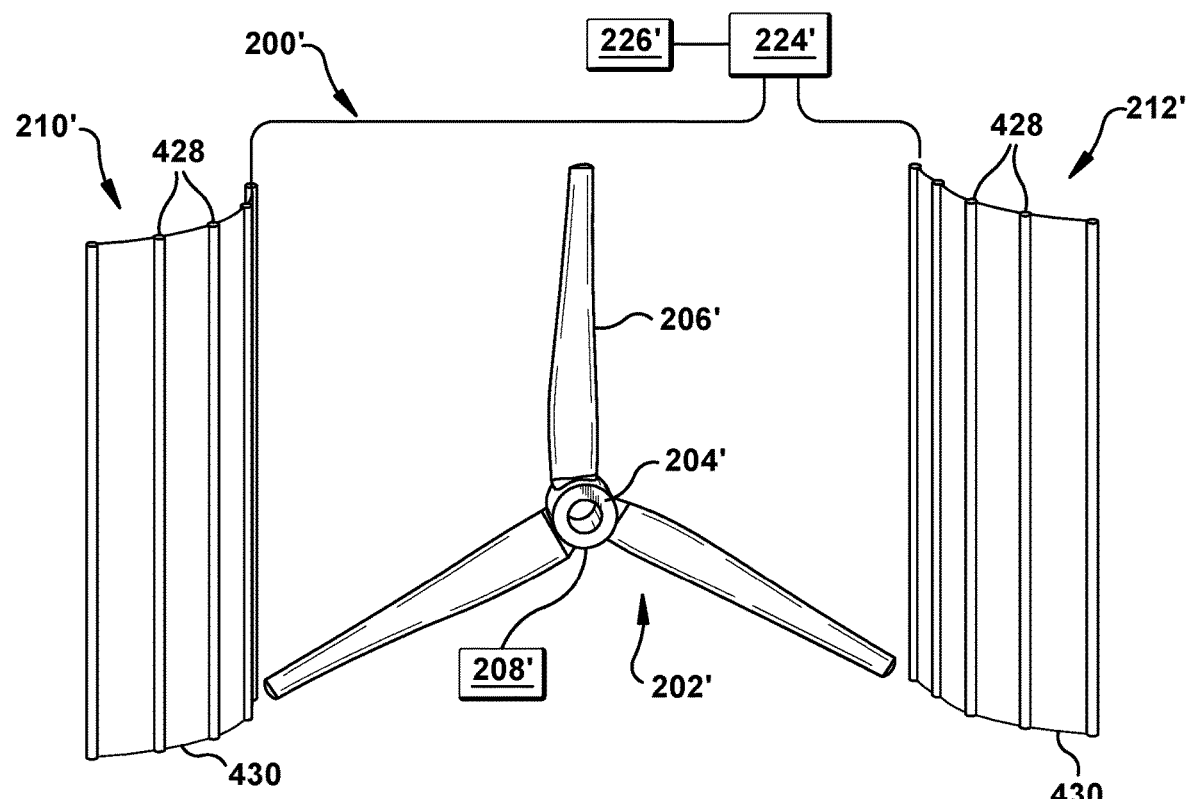
FIG. 4A is a front perspective view of a second example aspect of the present invention in a working configuration.
Figure 4B:
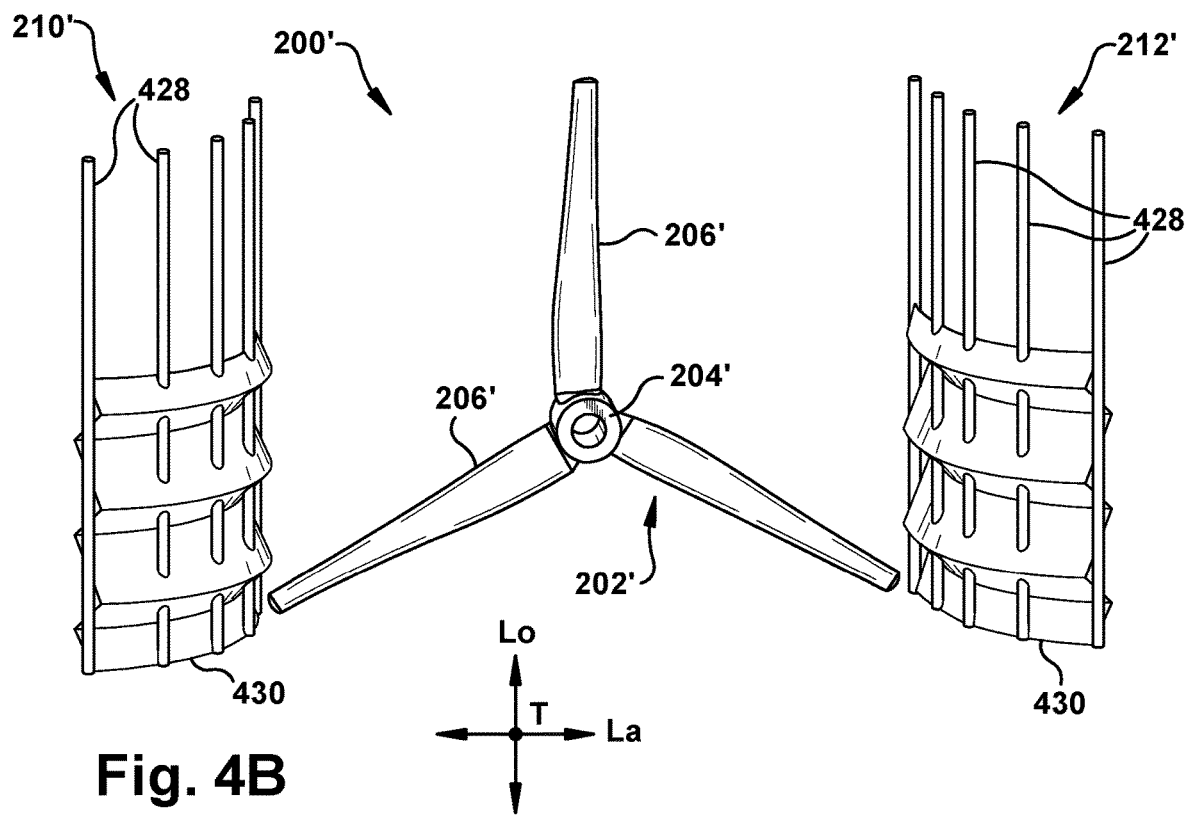
FIG. 4B is a front perspective view of the second aspect of FIG. 4A in an at least partially stowed configuration.

FIGS. 4A-4B illustrate a second embodiment of an apparatus 200' for selectively amplifying wind speed adjacent the turbine rotor 202'. The apparatus 200' of FIGS. 4A-4B is similar to the apparatus of FIGS. 2-3B and therefore, structures of FIGS. 4A-4B that are the same as or similar to those described with reference to FIGS. 2-3B have the same reference numbers with the addition of a "prime" mark. Description of common elements and operation similar to those in the previously described first embodiment will not be repeated with respect to the second embodiment, but should instead be considered to be incorporated below by reference as appropriate.

The apparatus 200' shown in FIGS. 4A-4B is similar to that disclosed in the article "Wind Energy Harnessing System for Low and High Wind Speeds" (Rashidi et al., paper no. IMECE2019-11995 from the Proceedings of 2019 ASME International Mechanical Engineering Congress & Exposition, held 8-14 Nov. 2019 in Salt Lake City, Utah, USA), the entire contents of which are incorporated herein by reference.

In the apparatus 200' of FIGS. 4A-4B, at least one of the first and second deflection panels 210' and 212' includes at least one support upright 428 supporting a flexible sheet 430. The flexible sheet 430 is configured for selective longitudinal expansion and collapse relative to, and guided by, the support upright(s) 428. This is a similar mechanism to that used in the window covering commonly referenced as a "Roman shade". The at least one support upright 428 remains stationary relative to the turbine rotor 202' during operation of the apparatus 200'. The flexible sheet 430 expands to an increased longitudinal dimension toward the working configuration, as shown in FIG. 4A, and collapses to a reduced longitudinal dimension toward the stowed configuration, as shown in FIG. 4B.

FIGS. 5-8 illustrate a third embodiment of an apparatus 200" for selectively amplifying wind speed adjacent the turbine rotor 202". The apparatus 200" of FIGS. 5-8 is similar to the apparatuses of FIGS. 2-4B and therefore, structures of FIGS. 5-8 that are the same as or similar to those described with reference to FIGS. 2-4B have the same reference numbers with the addition of a double "prime" mark. Description of common elements and operation similar to those in the previously described first and second embodiments will not be repeated with respect to the third embodiment, but should instead be considered to be incorporated below by reference as appropriate.

FIGS. 5-8 depict an apparatus 200" for selectively amplifying wind speed adjacent a turbine rotor 202". Like the apparatuses 200, 200' of the first and second embodiments, the apparatus 200" includes a first deflection panel 210", having a curved front profile, and a second deflection panel 212", having a curved front profile. The curved front profiles of at least one of the first and second deflection panels 210" and 212" may have at least a 90-degree curved span. More particularly, at least one of the curved front profiles may have a curved span between about 85-degrees and 130-degrees, such as from about 105-degrees to 115-degrees.

The apparatus 200" shown in FIGS. 5-8 also includes a frame 532 extending in a lateral direction relative to the turbine rotor 202" on at least one of the first and second sides thereof. Though a substantially symmetrical, single-piece frame 532 is depicted in FIGS. 5-8, it is contemplated that the frame 532 could be located on only one lateral side of the turbine rotor 202", a plurality of separate frames 532 could be provided, or any other frame-type arrangement could be designed by one of ordinary skill in the art for a particular use environment, as desired.

In the apparatus 200" of FIGS. 5-8, at least one of the first and second deflection panels 210" and 212" is movably connected to the frame 532 for sliding lateral motion with respect thereto. The term "sliding lateral motion" is used herein to indicate that the first and second deflection panels 210" and 212" maintain an initial orientation relative to the turbine rotor 202" in the longitudinal and transverse directions, but shift laterally relative to the turbine rotor 202. This shift may occur through a true, purely sliding motion of stationary surfaces against one another (e.g. rail-on-rail), via a wheeled or conveyor belt type arrangement, and/or in any other suitable manner, as long as the initial orientation in the longitudinal and transverse directions is maintained for many use environments.

The first and second deflection panels 210" and 212" are arranged to travel between a working configuration ("W" in FIG. 7) at a first lateral position relative to the turbine rotor 202", and a stowed configuration ("S" in FIG. 7) at a second lateral position relative to the turbine rotor 202. The second lateral position is further away from the turbine rotor 202" than is the first lateral position.

The absolute distances between the first and second lateral positions and the turbine rotor 202", and other design considerations for the apparatus 200", may at least partially be selected responsive to factors including, but not limited to, the size of the apparatus 200"; the available ambient space; the size, configuration, and other characteristics of the turbine rotor 202"; local wind conditions; the design of the frame 532 or other specific components of the apparatus 200"; and/or any other relevant factors. One of ordinary skill in the art will readily be able to configure an apparatus 200" according to the third embodiment which is suitable for a desired use environment.

As with the first and second embodiments, the first and second deflection panels 210" and 212" are both configured to amplify wind speed adjacent the turbine rotor 202" when in the working configuration, and to have minimal effect upon the wind speed adjacent the turbine rotor 202" when in the stowed configuration. Again akin to the previously discussed embodiments, the first and second deflection panels 210" and 212" of the third embodiment may each be movable between the stowed and working configurations independent from one another, and the apparatus 200" may include a motor (shown schematically at 224" in FIG. 5) and/or any desired mechanism(s) for selectively moving at least one of the first and second deflection panels between the stowed and working configurations responsive to deflector commands from a controller 226". It is contemplated that, in any embodiment of the present invention, the motor 224" and/or controller 226" could be carried by, and/or form a part of, the first and/or second deflection panels 210" and 212".

For any embodiment of the present invention, at least one of the first and second deflection panels 210" and 212" may be maintained in at least one predetermined intermediate configuration, longitudinally interposed between the stowed and working configurations, responsive to a measured wind speed adjacent the turbine rotor 202". That is, the first and/or second deflection panels 210" and 212" could be maintained partially deployed (e.g., moved laterally to a position slightly away from the working configuration but not all the way into the stowed configuration) if the incoming wind speed is faster than a user desires to amplify in a "normal working" mode of the apparatus 200", but not yet fast enough to fear damage from a first or second deflection panel 210" or 212" that is not completely in a stowed configuration. Movement of the first and second deflection panels 210" and 212" between the working and stowed configurations could therefore be considered to occur along a range of possible positions, not just binary working or stowed.

As shown in FIGS. 5-8, the apparatus 200" includes the previously mentioned frame 532, which may include at least one rail 534. At least one of the first and second deflection panels 210" and 212" may include a bogie 536, which is movably connected to the rail 534 for rolling motion therealong, to slide the at least one of the first and second deflection panels 210" laterally with respect to the frame. One example bogie 536 is shown in enlarged view, on a rail 534, in FIG. 6. As is apparent from that Figure, rail 534 is a "U" shaped channel, which may assist with tracking and durability for the bogie 536 and the apparatus 200" as a whole. However, the rail 534 could be a circular rod, a "C" shaped channel, a piece of bar stock, or have any other suitable configuration, with which any appropriately designed bogie 536 could be cooperatively arranged for sliding and/or rolling motion, in order to shift the first and second deflection panels 210" and 212" as discussed At least in part because the "U" shaped channel of rail 534 shown in FIGS. 5-8 may tend to collect ambient moisture, there may be one or more apertures (not shown) provided in the rail 534 to assist with draining. It is contemplated that the rail 534 may also or instead be longitudinally angled between the first and second lateral positions (i.e., tilt upward or downward with respect to the turbine rotor 202"), which may also assist with drainage. In addition, when the rail 534 is angled or canted, at least one of the first and second deflection panels 210" and 212" may be urged toward a selected one of the first and second lateral positions under the influence of gravity. Stated differently, the rail 534 could have a longitudinal angulation which tends to bias at least one of the first and second deflection panels 210" and 212" toward a selected one of the working and stowed configurations, such that the biased deflection panel(s) will tend to move towards the selected configuration under, for example, a loss of motive power for the apparatus 200". This biasing, when present, may be provided for efficiency, redundancy in case of system failure, ease of assembly and/or use, and/or for any other desired reason.

The frame 532 shown in FIGS. 5-8 includes top and bottom rails 534, which are longitudinally spaced from one another. At least one of the first and second deflection panels 210 and 212 includes a top bogie 536 and a bottom bogie 536 for rolling motion along the top and bottom rails 534, respectively. Each of the top and bottom rails 534, and the top and bottom bogies 536, may have any suitable configuration, regardless of configuration of the other rail or bogie. The apparatus 200" may include any desired number, arrangement, and configuration of rails 534, bogies 536, and any other component of the apparatus 200", as desired for a particular use environment, and motive power may be provided to the apparatus 200" in any desired manner.

Figure 8:
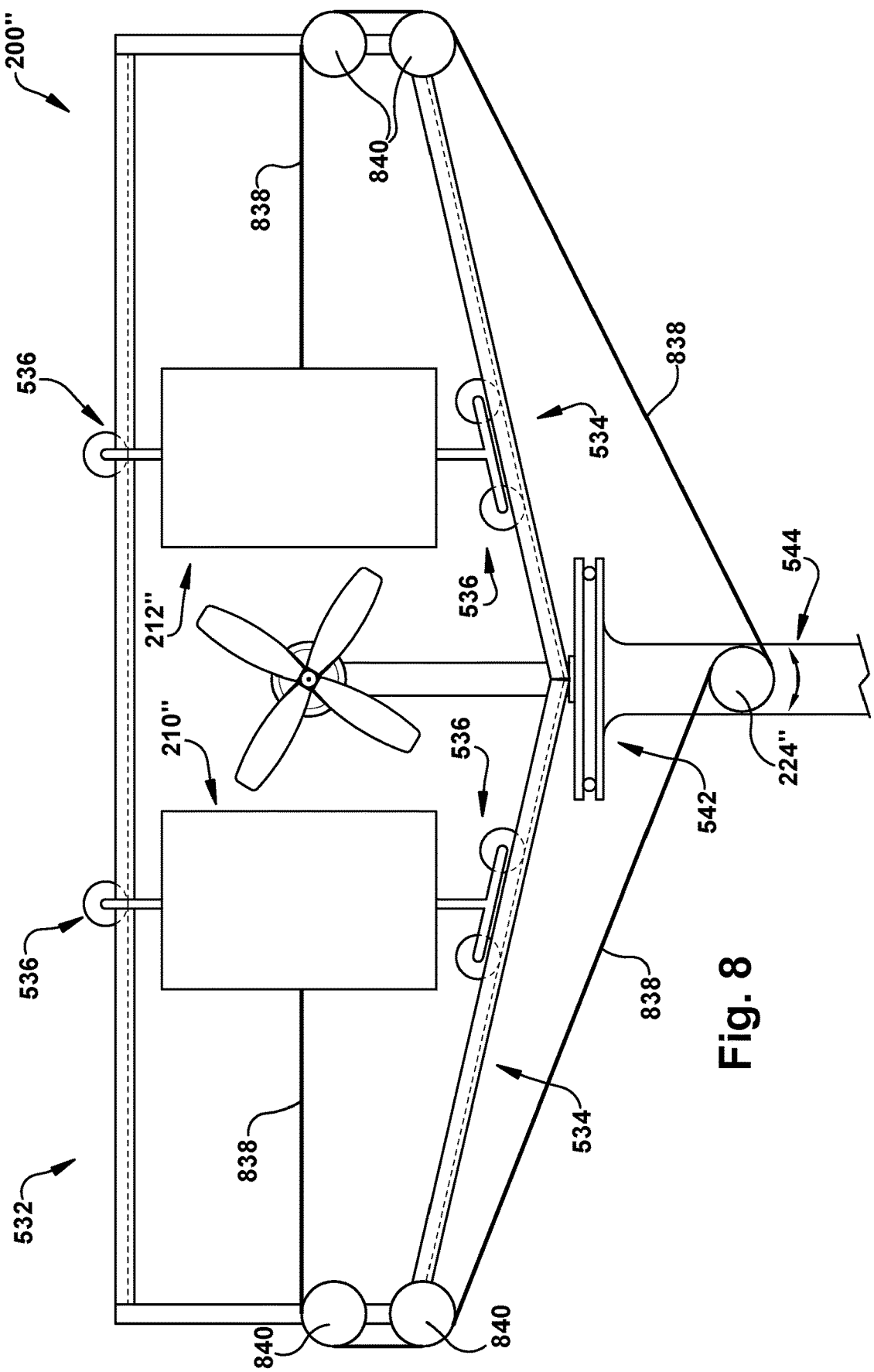
FIG. 8 is a schematic front view of an example arrangement of several components of the third aspect of FIG. 6.

For example, and as shown in FIG. 8 (turbine rotor 202" and related components are omitted from this depiction, for clarity), an example apparatus 200" may utilize a rope 838 and pulley 840 arrangement, combined with a centrally located motor 224", which winds the rope(s) 838 to pull the first and second deflection panels 210" and 212" up a frame 532 having rails 534 which are slanted upward as they travel laterally away from the turbine rotor 202". The wheels of the upper bogies 536 shown in FIG. 8 could lift slightly away from their corresponding top rail 534 during travel of the first and second deflection panels 210 and 212 from the working toward the stowed configurations, although it is also contemplated that the bogie 536 wheels and top rail 534 could be designed to avoid such "popping out" of the wheels. The tilt angle of the bottom rail 534 could also be slight enough (e.g., in the range of about 2-degrees to 10-degrees from the horizontal, more specifically about 5-degrees to 7-degrees) that the top bogies 536 are not lifted out of the top rail 536 during the course of travel between the working and stowed configurations.

In the arrangement shown in FIG. 8, the motor 224" actively controls the rope 838 to move the first and/or second deflection panels 210" and 212" from the working to the stowed configurations, and then the motor 224" (and/or a brake mechanism, not shown), at least partially releases the rope 838 (optionally responsive to a command from the controller 226) and allows gravity and the angle bias of the frame 532 to passively draw the first and/or second deflection panels 210" and 212" back from the stowed to the working configurations. The ropes 838, pulleys 840, motor 224, and other components of the apparatus 200 could be at least partially enclosed by a housing (not shown), to assist with protection from ambient conditions, including vandalism and weather. There are many other ways in which the first and second deflection panels 210 and 212 could be moved between the working and stowed conditions as desired, and one of ordinary skill in the art would be readily able to provide suitable additional components, as desired.

With reference back to FIG. 5, the frame 532 and turbine rotor 202" may be held stationary relative to each other by a swivel mount 542 of a mast 544. When present, the swivel mount 542 may be configured to rotate in a lateral-transverse plane (i.e., substantially parallel to the plane of the page in FIG. 7) to present an intake side of the turbine rotor 202" toward an oncoming or upstream wind direction. The swivel mount 542 may be configured in any desired manner, such as by including a thrust bearing or other powered or unpowered rotational connection, which may also be locked as desired to prevent rotation. It is contemplated that, for most implementations of the apparatus 200", the swivel mount 542" will be placed in a position relative to the apparatus 200", the turbine rotor 202", and other components of the wind turbine in which the mass carried atop the swivel mount 542 will be movable by relatively small wind fluctuations. Thus, a wind turbine including the apparatus 200 may act in a "windmill" type manner, turning slightly to follow changes in wind direction and therefore increase efficiency and output of the turbine rotor 202".

A method of selectively deflecting wind power adjacent a turbine rotor 202 includes providing an apparatus 200 according to any embodiment or aspect of the present invention. The first and second deflection panels 210 and 212 can be moved between a working configuration, and a stowed configuration in which the first and second deflection panels have a minimal effect upon the wind speed adjacent the turbine rotor. In the working configuration, the curved front profiles of the first and second deflection panels 210 and 212 will tend to amplify wind speed adjacent to the turbine rotor 202 and thereby provide for greater power generation than the ambient wind speeds would normally allow, with conventional a turbine rotor 202.

The first and second deflection panels 210 and 212 could be moved relative to one another independently and/or in concert, and using any desired active and/or passive mode of power, controlled in any desired manner and in response to any desired inputs. For example, selectively moving the first and second deflection panels 210 and 212 between the working configuration and a stowed configuration could include measuring a wind speed adjacent the turbine rotor 202, providing a motor 224 for selectively moving at least one of the first and second deflection panels 210 and 212 between the stowed and working configurations responsive to deflector commands, and at least partially generating the deflector commands responsive to the measured wind speed adjacent the turbine rotor 202.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. As another example, although the present specification uses "air" and a "wind" turbine as an example use environment, it is contemplated that the apparatus 200 could also or instead be used in another fluid, such as, but not limited to, water or steam. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. An apparatus for selectively amplifying wind speed adjacent a turbine rotor, the apparatus comprising:
 a first deflection panel, having a curved front profile for selective placement laterally on a first side of the turbine rotor in a working configuration;

a second deflection panel, having a curved front profile for selective placement laterally on a second side of the turbine rotor, laterally opposite the first side, in a working configuration; and
a frame extending in a lateral direction relative to the turbine rotor on at least one of the first and second sides thereof, and at least a corresponding one of the first and second deflection panels is movably connected to the frame for sliding lateral motion with respect thereto between the working and stowed configurations;
wherein at least one of the first and second deflection panels is movable laterally with respect to the turbine rotor between a working configuration at a first lateral position relative to the turbine rotor and a stowed configuration at a second lateral position relative to the turbine rotor, the second lateral position being further away from the turbine rotor than is the first lateral position; and
wherein the first and second deflection panels are both configured to amplify wind speed adjacent the turbine rotor when in the working configuration, and to have minimal effect upon the wind speed adjacent the turbine rotor when in a stowed configuration.

2. The apparatus of claim 1, wherein the first and second deflection panels, when in the working configuration, have front profiles that are substantially mirrored from one another about a transverse-longitudinal plane passing through a support post of the turbine rotor.

3. The apparatus of claim 1, wherein the curved front profiles present a convex aspect toward a direction of wind entry to the turbine rotor.

4. The apparatus of claim 1, wherein the first and second deflection panels are each movable between the stowed and working configurations independent from one another.

5. The apparatus of claim 1, including a motor for selectively moving at least one of the first and second deflection panels between the stowed and working configurations responsive to deflector commands from a controller, the deflector commands being at least partially generated by the controller responsive to a measured wind speed adjacent the turbine rotor.

6. The apparatus of claim 1, including a mechanical fuse configured to move at least one of the first and second deflection panels between the working configuration and a halt configuration responsive to a wind speed adjacent the turbine rotor.

7. The apparatus of claim 1, wherein at least one of the curved front profiles has at least a 90-degree curved span.

8. The apparatus of claim 7, wherein at least one of the curved front profiles has a curved span between 105-degrees and 115-degrees.

9. A wind turbine system, comprising
the apparatus of claim 1;
the turbine rotor, including a hub and at least one blade; and
a generator.

10. An apparatus for selectively amplifying wind speed adjacent a turbine rotor, the apparatus comprising:
a first deflection panel, having a curved front profile;
a second deflection panel, having a curved front profile; and
a frame extending in a lateral direction relative to the turbine rotor on at least one of first and second sides of the turbine rotor;
wherein at least one of the first and second deflection panels is movably connected to the frame for sliding lateral motion with respect thereto between a working configuration at a first lateral position relative to the turbine rotor and a stowed configuration at a second lateral position relative to the turbine rotor, the second lateral position being further away from the turbine rotor than is the first lateral position; and
wherein the first and second deflection panels are both configured to amplify wind speed adjacent the turbine rotor when in the working configuration, and to have minimal effect upon the wind speed adjacent the turbine rotor when in the stowed configuration.

11. The apparatus of claim 10, wherein the frame and turbine rotor are held stationary relative to each other by a swivel mount of a mast, the swivel mount being configured to rotate in a lateral-transverse plane to present an intake side of the turbine rotor to an oncoming wind direction.

12. The apparatus of claim 10, wherein the first and second deflection panels are each movable between the stowed and working configurations independent from one another.

13. The apparatus of claim 10, including a motor for selectively moving at least one of the first and second deflection panels between the stowed and working configurations responsive to deflector commands from a controller, the deflector commands being at least partially generated by the controller responsive to a measured wind speed adjacent the turbine rotor.

14. The apparatus of claim 10, wherein at least one of the first and second deflection panels is maintained in at least one predetermined intermediate configuration, longitudinally interposed between the stowed and working configurations, responsive to a measured wind speed adjacent the turbine rotor.

15. The apparatus of claim 10, wherein at least one of the curved front profiles has at least a 90-degree curved span.

16. The apparatus of claim 15, wherein at least one of the curved front profiles has a curved span between 105-degrees and 115-degrees.

17. The apparatus of claim 10, wherein the frame includes at least one rail and the at least one of the first and second deflection panels includes at least one of a top bogie and a bottom bogie which is movably connected to the rail for rolling motion therealong to slide the at least one of the first and second deflection panels laterally with respect to the frame.

18. The apparatus of claim 17, wherein the frame includes top and bottom rails, longitudinally spaced from one another, and the at least one of the first and second deflection panels includes a top bogie and a bottom bogie for rolling motion along the top and bottom rails, respectively.

19. The apparatus of claim 17, wherein the rail is longitudinally angled between the first and second lateral positions, such that the at least one of the first and second deflection panels is urged toward a selected one of the first and second lateral positions under the influence of gravity.

* * * * *